United States Patent [19]

Macidull

[11] 3,756,001
[45] Sept. 4, 1973

[54] FRUIT HARVESTING APPARATUS

[76] Inventor: John C. Macidull, 400 B Tyler St., China Lake, Calif. 93555

[22] Filed: May 18, 1972

[21] Appl. No.: 254,432

[52] U.S. Cl. ................................. 56/328, 56/332
[51] Int. Cl. ........................................ A01g 19/00
[58] Field of Search ..................... 56/328, 332, 335, 56/336, 32

[56] References Cited
UNITED STATES PATENTS

| | | | |
|---|---|---|---|
| 2,968,907 | 1/1961 | Bernheim | 56/332 |
| 3,664,104 | 5/1972 | Jamshidi | 56/332 |
| 3,564,826 | 2/1971 | Middleton, Jr. | 56/328 R |
| 3,473,312 | 10/1969 | Holt | 56/332 |
| 3,538,695 | 11/1970 | Cornell | 56/332 |
| 3,165,880 | 1/1965 | Buie, Jr. | 56/336 |

*Primary Examiner*—Russell R. Kinsey
*Attorney*—Neil F. Martin and Carl R. Brown

[57] ABSTRACT

Apparatus for removing fruit from a tree within the tubular body of the device utilizing vacuum pressure. The fruit is received against a flexible diaphragm adjacent the end of the tubular body portion. The fruit sealing against the diaphragm has the effect of decreasing the pressure within the remainder of the body portion under the influence of the vacuum. This reduction in pressure is sensed by a pressure transducer which activates a cutter mechanism secured to the end of the tubular body. The cutter severs the fruit stem freeing the fruit. The transducer also opens a valve to bleed air from the flexible diaphragm and allow the severed fruit to pass down the body into a storage bin under the influence of the vacuum source.

7 Claims, 7 Drawing Figures

PATENTED SEP 4 1973

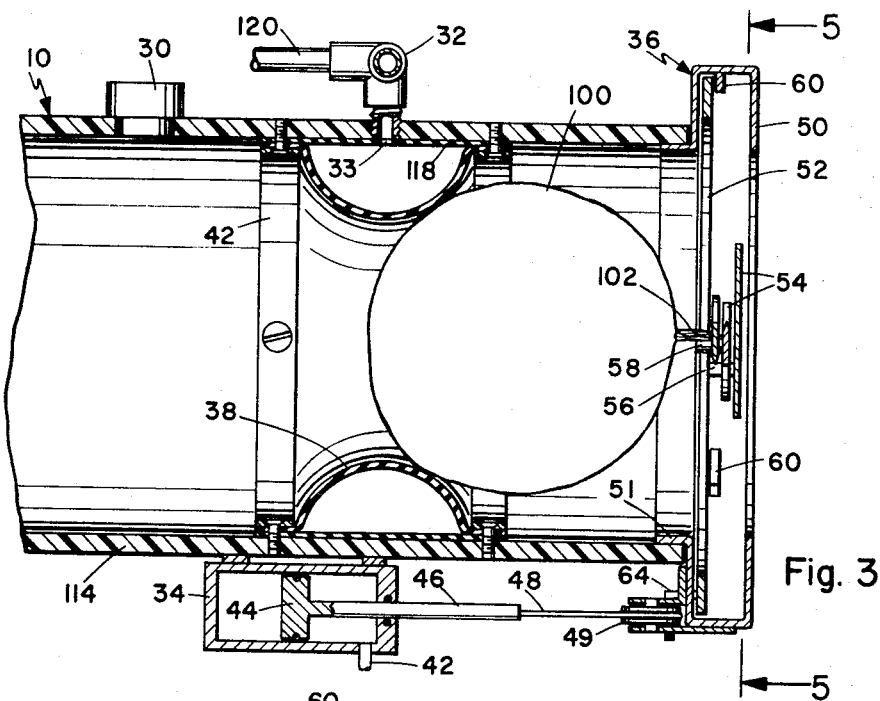
Fig. 3
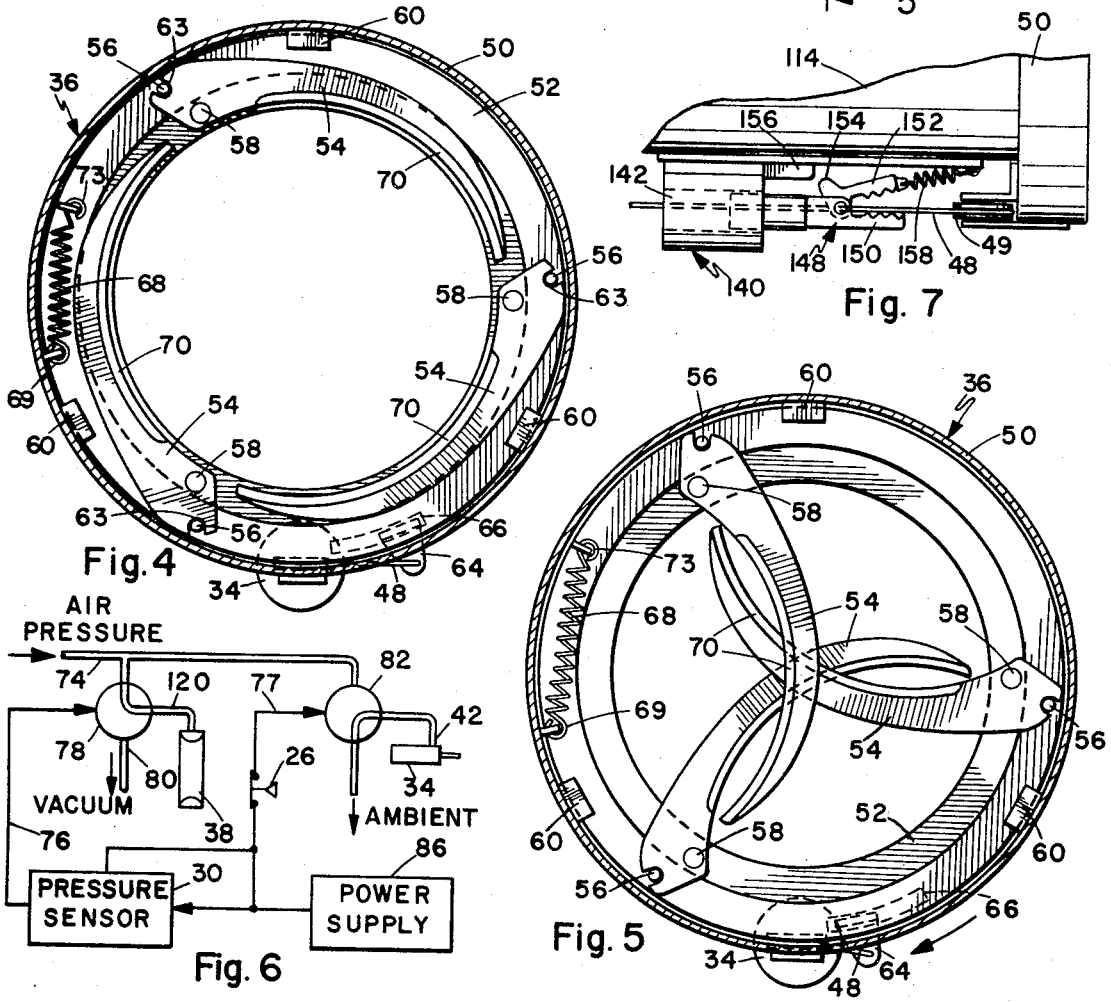
Fig. 4
Fig. 7
Fig. 5
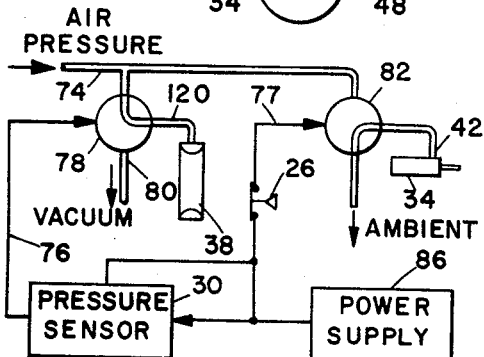
Fig. 6

3,756,001

FRUIT HARVESTING APPARATUS

BACKGROUND OF THE INVENTION

The cost of labor has become an increasingly significant factor in the overall cost of raising fruit or similar farm produce. The fruit harvesting operation is the most highly labor intensive. As a result of the labor intensive nature of the harvesting operation, various devices have been proposed to reduce the labor requirement in harvesting and thereby lower the overall cost of the harvested fruit.

Despite the very definite need and considerable development expense, no individual or organization has been able to produce a fruit harvesting machine that is satisfactory in all respects. The fruit harvesting devices thus far provided are expensive and complex, requiring considerable maintenance, and thereby defeating the labor saving aspects of the harvesting operation. Further, these devices have frequently not provided for the gentle handling of the fruit, and thus damaging a substantial percentage of the harvest.

The most highly sought after fruit harvesting device is one that can be handled by a single operator and selectively plucks selected fruit from the tree, without damaging the product and automatically conveys it to a storage bin. A number of such devices have been proposed. Frequently, these devices utilize a vacuum pump to provide all or a portion of the force necessary to remove the fruit from the tree and convey it to a storage location. However, many of the pre-existing devices for harvesting fruit in this fashion have been impractical for a number of reasons. Some such prior art devices are cumbersome that they are unwieldy for use by a single operator. Other such devices do not provide for proper severing of the fruit stem and thereby damage the fruit when the stem is forceably pulled from the limb. An additional defect of prior art fruit harvesting devices has been the rough manner in which the fruit is handled, particularly during the actual picking itself, and the initial phases of conveying.

It is therefore highly desirable to provide a fruit harvesting apparatus that is light in weight and easily managed by a single individual, so that selected pieces of fruit may be picked from the tree rapidly and efficiently, with minimum damage to the fruit, and with proper severing of the fruit stem. Such a device is particularly to be desired if it is utilizable in conjunction with standardized containers.

SUMMARY OF THE INVENTION

An exemplary embodiment of the invention provides a fruit harvesting apparatus that is light in weight and relatively simple in overall design, so that a single operator can utilize it to selectively pick pieces of fruit. The apparatus is configured to minimize the damage to the fruit during the harvesting operation, and properly sever the stem without operator action. After the fruit is severed, it is automatically conveyed and delivered to a container, which container may be a standardized container, and therefore utilizable for storage or shipment of the fruit.

The invention incorporates a tubular body upon which is mounted operator handles, a pressure sensor and the cutting mechanism. The interior of the tubular body contains a variable restriction throat, comprising a flexible diaphragm. Vacuum suction for the system is provided by a vacuum pump mounted on a receptacle cover together with a pressure source and control unit.

In operation, the head of the device is placed in the proximity of a piece of fruit, by the operator maneuvering the tube, gripping the handles. The fruit is drawn into the unit by the suction created by the pump, and lodges and seals against the resilient diaphragm. This lodging action does not damage the fruit due to the flexible and resilient nature of the diaphragm. The diaphragm is in an expanded condition, caused by delivering of pressure into the interior of the diaphragm, and therefore provides a restricted throat, through which the fruit may not pass. The sealing of the fruit against the diaphragm, lowers the pressure downstream in the tube as a result of the reduction in the air flow to the vacuum pump. This pressure reduction is sensed by a pressure transducer located downstream from the variable diaphragm. The pressure transducer signal activates electrically controlled valves, whereby the pressure is dumped from the flexible diaphragm and, at the same time, actuation of the stem cutters is effected. With the stem severed, and the diaphragm collapsing, the fruit is drawn into the tubular body, and down a flexible conduit to the storage bin.

It is therefore an object of the invention to provide a new and improved fruit harvesting apparatus.

It is another object of the invention to provide a new and improved fruit harvesting apparatus that does not damage the fruit during picking or conveying.

It is another object of the invention to provide a new and improved fruit harvesting apparatus incorporating a flexible diaphragm for positioning, and pressure transducer actuating functions.

It is another object of the invention to provide a new and improved fruit harvesting apparatus with an automatically actuated stem cutting mechanism.

It is another object of the invention to provide a new and improved fruit harvesting apparatus that provides an operator maneuvered section that is relatively light in weight, and uncomplicated in design.

It is another object of the invention to provide a new and improved fruit harvesting apparatus that mounts all of the necessary power sources and control systems for the apparatus on the top of a fruit receptacle.

It is another object of the invention to provide a new and improved fruit harvesting apparatus that is relatively low in cost and manufacture.

Other objects and many attendant advantages of the invention will become more apparent upon a reading of the following detailed description together with the drawings, in which like reference numerals refer to like parts throughout and in which:

FIG. 3 is a view similar to FIG. 2, showing the stem cutting action.

FIG. 4 is a sectional view taken on line 4—4 of FIG. 2.

FIG. 5 is a sectional view taken on line 5—5 of FIG. 3.

FIG. 6 is a diagram of the actuating system.

FIG. 7 is a fragmentary side elevation view showing an alternative blade actuating mechanism.

Figure 1:
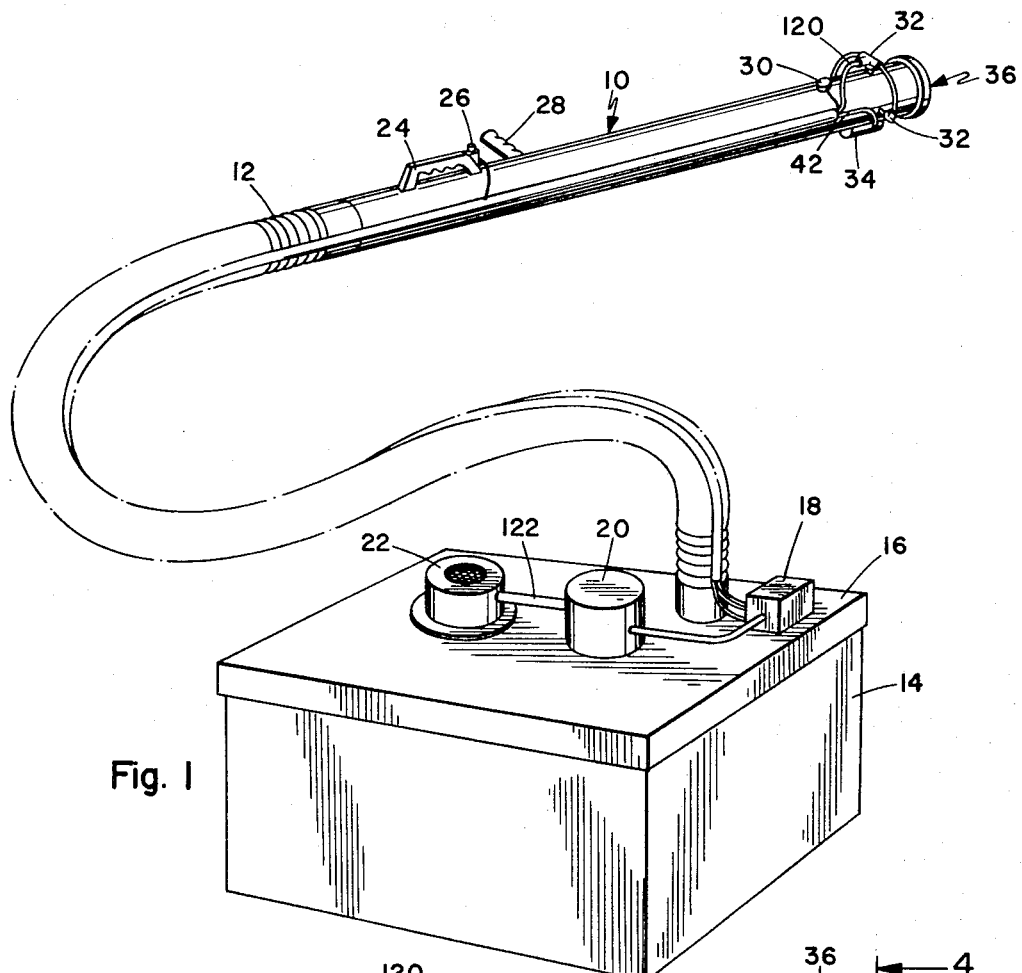
FIG. 1 is a perspective view of the complete apparatus.

Referring to the drawings, there is illustrated a tubular body portion 10. The tubular body portion mounts plural handles 24 and 28, together with manual cutter control 26. Also mounted on the exterior of the tubular body portion is the pressure sensor 30, diaphragm manifold connections 32, cutter head 36, and cutter actuator 34. The tubular body is connected to a fruit receptacle 14 by a flexible conduit 12. The receptacle 14 has a closure top 16. Top 16 also forms the support for the vacuum pump 22, diaphragm chamber 20, and control unit 18. The fruit receptacle top 16, while being illustrated in a rectangular configuration, may also be utilized in a circular configuration to adapt the fruit harvesting system of the invention to the drum type containers that may be utilized for collection and storage of the harvested fruit.

Figure 2:
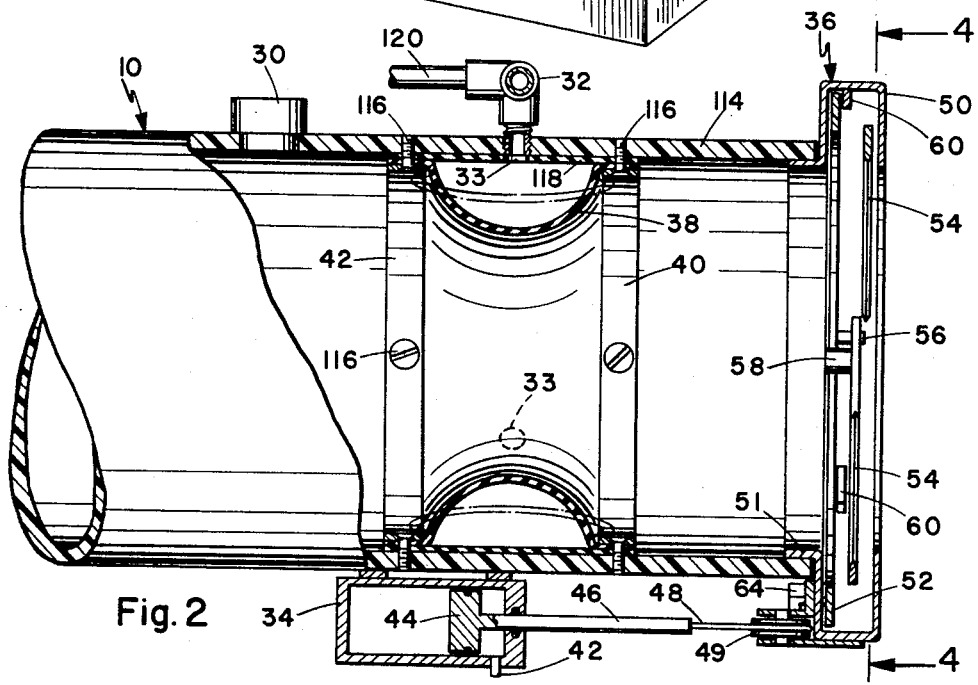
FIG. 2 is an enlarged side elevation view of the fruit receiving portion, partially cut away.

Referring particularly to FIG. 2, the details of the diaphragm and cutter head of the invention are illustrated. The tubular body 10 is illustrated as comprising a tube having wall 114. The tube may advantageously be constructed of PVC (polyvinyl chloride) tubing. This tubing has particular advantages when utilized with the invention, in that it is resistant to corrosion or other damage, is light in weight and low in cost.

A flexible diaphragm 38 is mounted within the tube, by a pair of mounting rings 40 and 42. These rings are secured through the thickness of the tube by a plurality of fasteners 116. The inner wall 118 of the diaphragm may additionally be adhesively secured to the inner wall of the tube. Wall 118 has a number of manifold holes 33 around its circumference to correspond to the manifold connectors 32. When pressure is delivered through line 120, the diaphragm is inflated to the solid line configuration in FIG. 2. When pressure is released to atmospheric, or if line 120 is connected to a vacuum source, the diaphragm collapses, increasing the inner diameter of the throat restriction, to the dotted line configuration illustrated. This change in the variable throat, from a restricted configuration, to an expanded or unrestricted configuration, results in a piece of harvested fruit being first held, and then released.

The cutter head 36 is mounted on the end of the tubular body 10. The body portion 50 of the cutter head, includes a mounting flange 51, inserted inside the body portion of the tube. An actuating ring 52 is held within the body portion by a plurality of tabs 60 but is free to rotate therein. The normal rotational orientation of the ring is determined by a spring bias, produced by spring 68, secured at end 69, to the body portion, and at end 73 to the actuating ring. Thus, the actuating ring is normally urged to the position illustrated in FIG. 4 by the bias of spring 68. Rotation of the actuating ring to the position illustrated in FIG. 5 is effected through the use of a pneumatic cylinder 34. Cylinder 34 is mounted on the tubular body and includes a pressure connection 42 to provide pressure to the pneumatic cylinder, and drive piston 44 to the opposite end of the cylinder. Movement of the piston 44 to the opposite end of the cylinder causes a movement of the piston rod 46, that is translated into movement of a cable 48. Cable 48 passes over a rotatably mounted pulley 49, which converts the direction of motion from axial of the tube, to substantially tangential to the actuating ring. The cable 48 terminates on an actuating ear 64, secured to the actuating ring through a slot 66 in the body of the cutter head 50.

A plurality of blades or cutters 54 are pivotally mounted on pivots 58, to the body of the cutter heads. The outer end of each cutter 54 contains a slot 63 for receiving a pin 56. The pins 56 are mounted to the actuating ring for movement therewith. Thus, the rotation of the actuating ring between the position illustrated in FIG. 4 and that of FIG. 5 causes rotation of the cutters 54 about the pivot 58, from the stowed or retracted position illustrated in FIG. 4, to the stem cutting position illustrated in FIG. 5. It will be noted that the cutters are curved and have a curved cutting edge 70. The effect of the motion illustrated is to produce an iris effect cutting action. Thus a stem being severed by the cutter is forced into contact with a cutter and toward the center of the cutter head, where it is eventually severed by contact with the three cutters, moving to reduce the iris diameter to zero. After a cutting stroke, and after the pressure on line 42 is released, the spring 68 returns the actuating ring to the FIG. 4 position, retracting the blades and returning the piston 34 for the next stroke.

The cutter is actuated automatically after a piece of fruit 100 seals against the diaphragm 38. The term sealing is intended to include sealing contact, as well as a non-contact restriction of the flow caused by the fruit being in the near proximity of the diaphragm 38. This sealing of the fruit restricts the flow of air to the vacuum source, thereby reducing the air pressure sensed by sensor 30. The reduction in pressure is translated into an electrical signal to two electrically controlled valves 78 and 82, illustrated in FIG. 6. Valve 78, when actuated by pressure sensor 30, on line 76, disconnects pressure being delivered from line 74, from the flexible diaphragm 38, and connects the diaphragm 38 to a vacuum source through line 80. Thus, the pressure within the diaphragm is rapidly carried off, causing the diaphragm to collapse, and permitting the fruit to pass. The same reduced pressure signal from the pressure sensor is delivered on line 77, to a valve 82. Valve 82 delivers pressure on line 42, to the cutter actuator 34, thereby inducing the cutter action, and severing the stem as is illustrated in FIG. 3. An alternative configuration for the cutter actuator is illustrated in FIG. 7. A feed-through solenoid 140, includes a body portion 142 secured to the tubular body 114. The cable 48 passes through clamping jaws 148. The clamping jaws 148 include a lower fixed jaw 150 and a pivoting jaw 152. When the solenoid 140 draws the clamping jaws 148 to the left in the illustration protrusion 154, is cammed by the surface 156 to cause the jaw 152 to clampingly engage cable 48 and draw it to the left, thereby actuating the cutters 54. A spring 158 causes the solenoid and jaws to return to their initial position after actuation. As the diaphragm collapses, the fruit is ready to be conveyed, having been severed from its stem, and the vacuum source 22 produces a conveying action, drawing the fruit through the body portion 10, flexible conduit 12 and into the receptacle 14. The passage of the fruit will again raise the pressure in the tubular body and this increased pressure, sensed by the pressure sensor 30, will result in recycling the valves 78 and 82, whereby pressure on line 74 will again be delivered to the diaphragm 38 causing it to expand, and pressure to the cutter actuator will be relaxed, causing the spring 68 to return the cutters 54 to the retracted position. A normally closed manual switch 26 is provided to actuate the cutter manually, should that be required for a stubborn stem or other purposes. The pressure delivered on line 74 may be supplied by a relatively small volume pump, or delivered from the pressure side of the vacuum pump by line 122 as illustrated. A diaphragm chamber 20 is incorporated whereby a relatively large volume of the pressurized air is retained, so that a large flow for expanding the diaphragm is immediately available.

OPERATION

In use, the device is activated by connecting the vacuum pump and pressure pump to a power source thus connecting the flow of delivery air through the tubular body 10. The operator then grasps the body by the two handles provided, and places the cutter head in the immediate proximity of a selected piece of fruit. The vacuum draws the fruit through the cutter head against the diaphragm, where it is lodged firmly due to the strong vacuum together with the variable restriction. The sealing effect of the fruit, causes the pressure sensor to detect a drop in pressure, whereupon it activates the cutter head to sever the stem, at the same time deflating the diaphragm. The severed fruit passes down the tubular body, into the flexible conduit 12 and into container 14. If, during a fruit picking operation, the initial actuating of the cutter head does not sever the fruit, the manual cutter switch 26 may be activated to cause successive actuations of the cutter head until the fruit is severed and delivered. After the container 14 is filled with picked fruit, the entire apparatus may be lifted from the container and placed over an empty container, whereupon the harvesting operation may be continued.

Having described my invention, I now claim:

1. In apparatus for use in the harvesting of fruit wherein the fruit is conveyed from the picked position to a receptacle by means of air flow through a flexible conduit, and wherein the improvement comprises:

an elongated tubular body having a picking end and a discharge end, a variable restriction throat within said body adjacent said picking end, said throat having a first configuration restricting the passage of fruit through said body, stem cutter means on said body and spaced from said throat in the direction of said picking end for severing the stem of said fruit, and control means operatively associated with said cutter means and said throat for causing said throat to retract to a second configuration that permits said fruit to pass along said body.

2. The apparatus of claim 1 wherein, said control means includes a sensor means mounted on said tubular body toward said discharge end from said variable restriction throat, said control means for causing said cutter means to sever said stem in response to a lowering of pressure detected by said sensor means.

3. The apparatus of claim 1 wherein, said stem cutter means comprises at least three curved blade means, pivotally mounted at an open end of said tubular body, and said blade means being operatively related to converge in the manner of an iris, to cut said stem centrally of said tubular body opening.

4. The apparatus of claim 3 wherein, said blade means are pivotally mounted on a first ring and are engaged by a second ring, said first and said second rings being relatively movable to pivot said cutter means and sever said stem.

5. The apparatus of claim 3 further including, a pneumatic cylinder mounted on said tubular body and operatively connected to said blade means.

6. The apparatus of claim 3 further including, a feed-through solenoid mounted on said tubular body and operatively connected to said blade means for actuation of said blade means.

7. The apparatus of claim 1 wherein, said variable restriction throat comprises a flexible diaphragm, and manifold means for deliverying operating pressure to the interior of said diaphragm.

* * * * *